March 23, 1965 W. E. KNAPP ETAL 3,174,556
TWO-WAY PLOW
Filed Feb. 19, 1962 6 Sheets-Sheet 1

INVENTORS.
WILLIAM E. KNAPP
EDWIN F. WADELTON
BY
Roger C Johnson
ATTORNEY

March 23, 1965 W. E. KNAPP ETAL 3,174,556
TWO-WAY PLOW
Filed Feb. 19, 1962 6 Sheets-Sheet 3

FIG.3

INVENTORS.
WILLIAM E. KNAPP
EDWIN F. WADELTON
BY
Roger C. Johnson
ATTORNEY

March 23, 1965 W. E. KNAPP ETAL 3,174,556
TWO-WAY PLOW
Filed Feb. 19, 1962 6 Sheets-Sheet 4

INVENTORS.
WILLIAM E. KNAPP
EDWIN F. WADELTON
BY
Roger C. Johnson
ATTORNEY

March 23, 1965     W. E. KNAPP ETAL     3,174,556

TWO-WAY PLOW

Filed Feb. 19, 1962     6 Sheets-Sheet 6

INVENTORS.
WILLIAM E. KNAPP
EDWIN F. WADELTON
BY

ATTORNEY

United States Patent Office 3,174,556
Patented Mar. 23, 1965

3,174,556
TWO-WAY PLOW
William E. Knapp and Edwin F. Wadelton, Los Angeles, Calif., assignors to Deere & Company, Moline, Ill., a corporation of Delaware
Filed Feb. 19, 1962, Ser. No. 174,045
14 Claims. (Cl. 172—212)

This invention relates generally to agricultural implements and more particularly to a two-way heavy duty plow.

The object and general nature of this invention is a provision of a two-way plow of the roll-over type, including a main frame having a part rockably receiving a rearwardly extended frame on which the right hand and left hand plow bottom standards and associated plow bottoms are carried, with new and improved hydraulic means for effecting and controlling the reversal of the plow bottoms between right and left hand plowing positions.

More specifically, it is a feature of this invention to provide a hydraulic cylinder for reversing the plow standard frame, that is, shifting the same between right and left hand plowing positions, with the cylinder so connected and arranged that when the plows are in a mid position, the cylinder is in its retracted position, whereby movement of the cylinder from its extended position to its retracted position serves to shift the standard frame from either plowing position to its mid point position, in which the plow is arranged for transport. It is a further feature of this invention to provide a new and improved rotary selector valve connected to be operated by movement of the standard frame for reversing the fluid flow to the cylinder, whereby movement of the standard frame through its mid point position serves to reverse the selector valve and thus utilize the retraction of the cylinder to raise the standard frame from a plowing position to a mid position and the subsequent extension of the cylinder to complete the movement of the standard frame from its mid position to its other plowing position.

Another important feature of this invention is provision of a two-way plow in which the frame carrying the right and left hand plow units is disposed, midway between the right and left hand plowing positions, in a position of unstable equilibrium in the retracted position of the reversing cylinder, whereby by turning the plow rather sharply in one direction or the other the standard frame may be started from a balanced mid position, after which movement of the standard frame to the selected plowing position will be controlled by the associated hydraulic cylinder.

Other novel features of the two-way plow of this invention includes a new and improved rear furrow wheel arrangement in which when the plows are reversed and the rear furrow wheel shifted laterally so as to always be in a position substantially directly behind the rearmost furrow opener. A further feature of this invention is the provision of new and improved means for locking the rear furrow wheel in a transport position. Another feature of this invention is the provision of new and improved means for mechanically holding the standard frame in its upper or mid point position to facilitate transport of the implement without relying on the hydraulic cylinder or any other means for holding the standard frame in transport position.

Still further novel features of this plow include new and improved means for mechanically holding the ground wheels in positions providing the desired depth of operation and new and improved means for holding the reversible or roll-over standard frame latched in either right hand or left hand plowing position.

These and other objects and advantages of this invention will be apparent to those skilled in the art after a consideration of the following detailed description, taken in conjunction with the accompanying drawings, in which:

FIGS. 4 and 5 also show the depth adjusting screw used for leveling the plow in a fore-and-aft direction.

FIG. 11 is a fragmentary plan view showing one of the locking latches for holding the standard frame in one of its plowing positions.

Figures 1, 2:
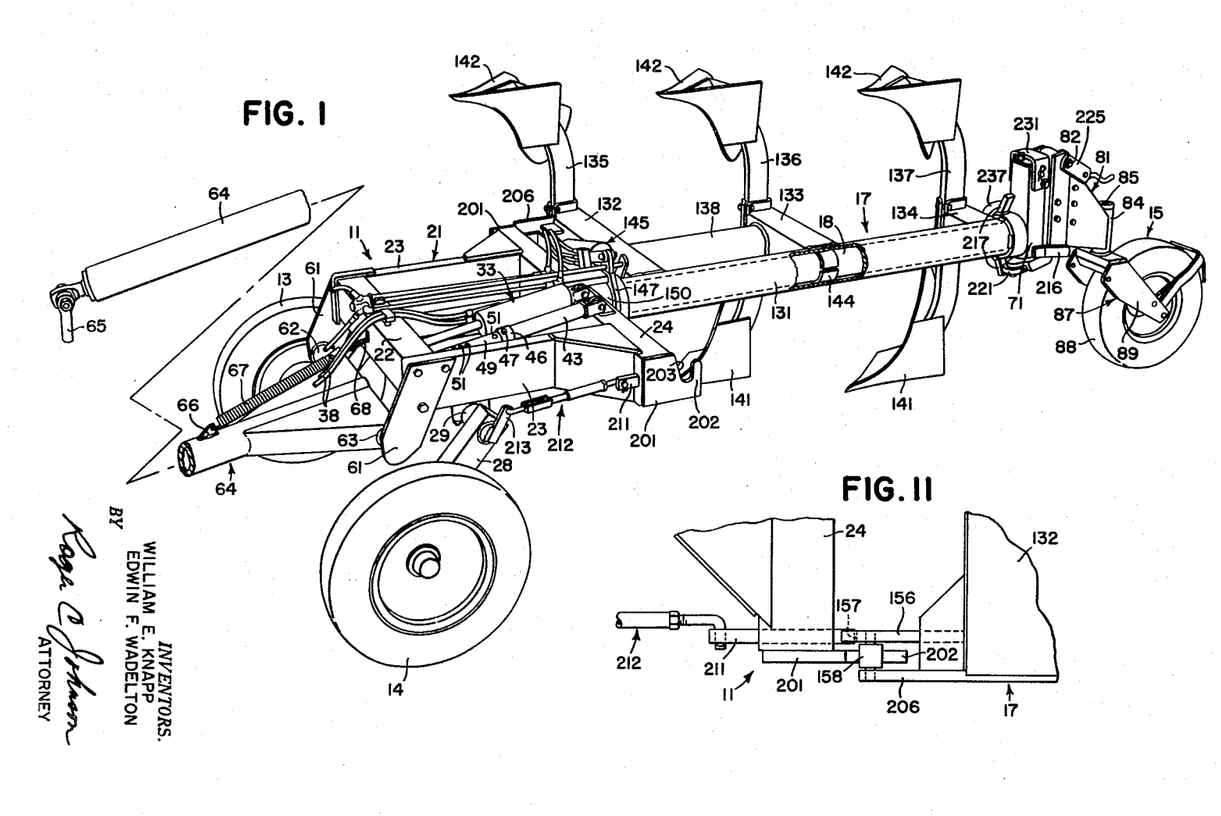
FIG. 1 is a perspective view of a three-bottom two-way towed plow incorporating the principles of the present invention.
FIG. 2 is a perspective view taken from the front of the plow shown in FIG. 1.
Figure 2:
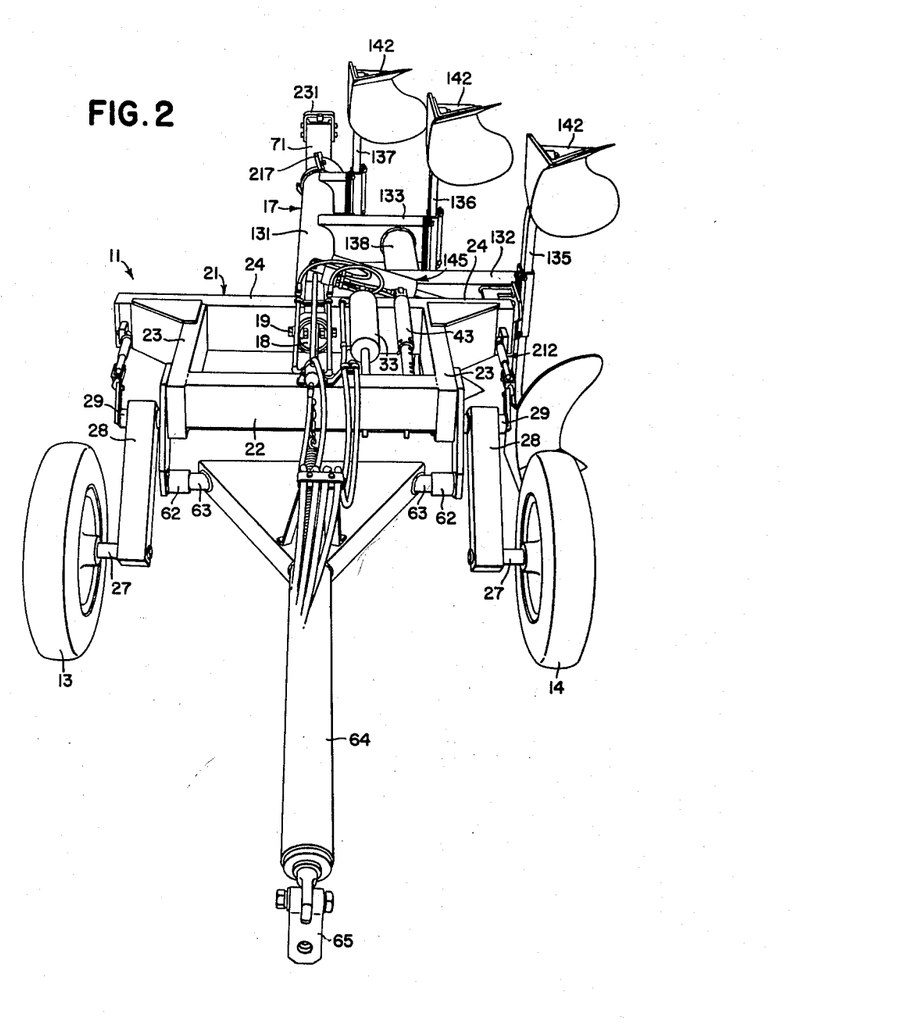

Referring first to FIGS. 1 and 2, the two-way plow of this invention comprises a carrier frame 11 supported by a pair of front ground wheels 13 and 14 and a rear furrow wheel 15 and a rockable standard frame 17 supported for reversal from right hand plowing to left hand plowing position on a rearwardly extending part of the carrier frame, preferably in the form of a pipe 18 fixed in any suitable way as by bolts 19 to the carrier frame 11. The carrier frame comprises a forward generally rectangular section 21 made up of a forward transverse frame bar 22, a pair of side bars 23 and a rear bar 24 suitably welded or otherwise rigidly interconnected to form a strong rigid structure. The front wheels 13 and 14 are mounted on stub axles 27 (FIG. 2) fixed to a pair of arm beams 28 and are swingably connected to a forward portion of the carrier frame 11 through a transverse axle 29 journaled in any suitable way in the forward portion of the rectangular carrier frame section 21. A generally intermediate portion of the shaft 29 (FIG. 3) carries an arm 32 fixed to the shaft 29 and extending generally upwardly therefrom. A power lift unit in the form of a cylinder 33 is pivotally connected at its rear end, as by cross member 34 to a lug 35 fixed to the rear carrier frame member 24, and the piston rod 37 of the unit 33 is connected to the outer end of the arm 32 by means including a pivot pin 36. Extension or retraction of the unit 33 will act to rock the shaft 29 and thus raise or lower the forward ground wheels 13 and 14 relative to the carrier frame 11. A pair of hose lines 38 extend from the cylinder 33 to a controlled source of fluid pressure carried on the tractor to which the plow of this invention is adapted to be connected.

Means is provided, acting between an arm 41 on the shaft 29, and a lug 42 on the rear frame member 24 to selectively hold the ground wheels 13 and 14 in different positions relative to the carrier frame so as to provide for different depths of operation. Such means comprises a tubular member 43 carrying a yoke 44 at its rear end and receiving a pivot 45 that swingably connects the tubular member 43 with the lug 42 on the carrier frame member 24. The forward end of the tubular member 43 abuts a collar 46 that is apertured to receive a cross pin 47 that is insertable in a collar opening 48, and also in selected openings formed in a stop bar 49 having a plurality of apertures 51, one set being disposed adjacent the forward end of the stop bar 49 and two additional openings 51 (FIG. 1) being adjacent the rear end of the bar 49, the rear portion of the bar 49 being telescopically associated with the rear tubular member 43. The latter member is free to move away from the collar 46, FIG. 1, as when the wheels 13 and 14 are swung downwardly to raise the frame. Movement of the wheels 13 and 14 upwardly to accommodate downward movement of the frame to a plowing position is limited by the collar 46 striking the end of the tubular member 43, as shown in FIG. 1. Thus, the openings in the depth bar 49 may be used for determining different positions of depth of plowing, or, as shown in FIG. 1, the two sets of rearward openings may be used for determining the position of the wheels for transport, thus relieving the hydraulic system of pressure when the implement is arranged for transport.

If the degree of adjustment desired is less than the distance between openings 51, for example, the plow may be raised, the tubular member 43 disconnected, and the pin 47 removed to permit the collar 46 to be reversed to provide an intermediate adjustment. It will be noted that the openings in the collar 46 for the pin 47 are not centered with respect to the axial dimension of the collar, and thus by turning the collar around a different spatial arrangement may be provided.

The forward end of the rectangular frame section 21 of the carrier frame 11 includes a pair of forwardly and downwardly extending hitch plates 61 rigidly secured to the side members 23 and carrying sleeves 62 (FIGS. 1 and 2) in which the trunnions 63 of the hitch tongue 64 are swingably received. The forward end of the tongue carries a swivel 65 to which the source of draft may be connected in any suitable way. Means to hold the tongue 64 in an approximately horizontal position is provided, such means being in the form of a spring 67 connected at its forward end to an apertured lug 66 fixed to the tongue 64. The rear end of the spring 67 is connected to a short length of chain 68 that is disposed in a tongue and slot opening 69 (FIG. 3) formed in the forward member 22 of the carrier frame.

The rearwardly extending part 18 on which the standard frame 17 is rockably mounted preferably is in the form of a pipe member that is connected rigidly, as described above, to the rectangular carrier frame portion 21. The rear end of the pipe member 18 is fixed rigidly to a vertically extending channel member 71 (FIG. 1) to which upper and lower apertured rearwardly extending lugs 72 and 73 (FIG. 4) are fixed. The apertures in the rear ends of these lugs are in vertical alinement and carry pivot members 75 and 76 to which a second pair of apertured lugs 77 and 78 are swingably connected. Fixed to the rear portions of the lugs 77 and 78 as by welding to opposite edges is a pair of vertical plates 79, forming with the latter bracket means 80 to which a rear wheel support member 81 is swingably connected about an upper horizontal transverse pivot 82. The rear wheel support 81 includes a rear generally vertical sleeve section 84 in which the vertical spindle 85 of a rear wheel yoke 87 is disposed for lateral swinging movement. A rear furrow wheel 88 is journaled for rotation between the side members 89 of the yoke 87.

Figure 3:
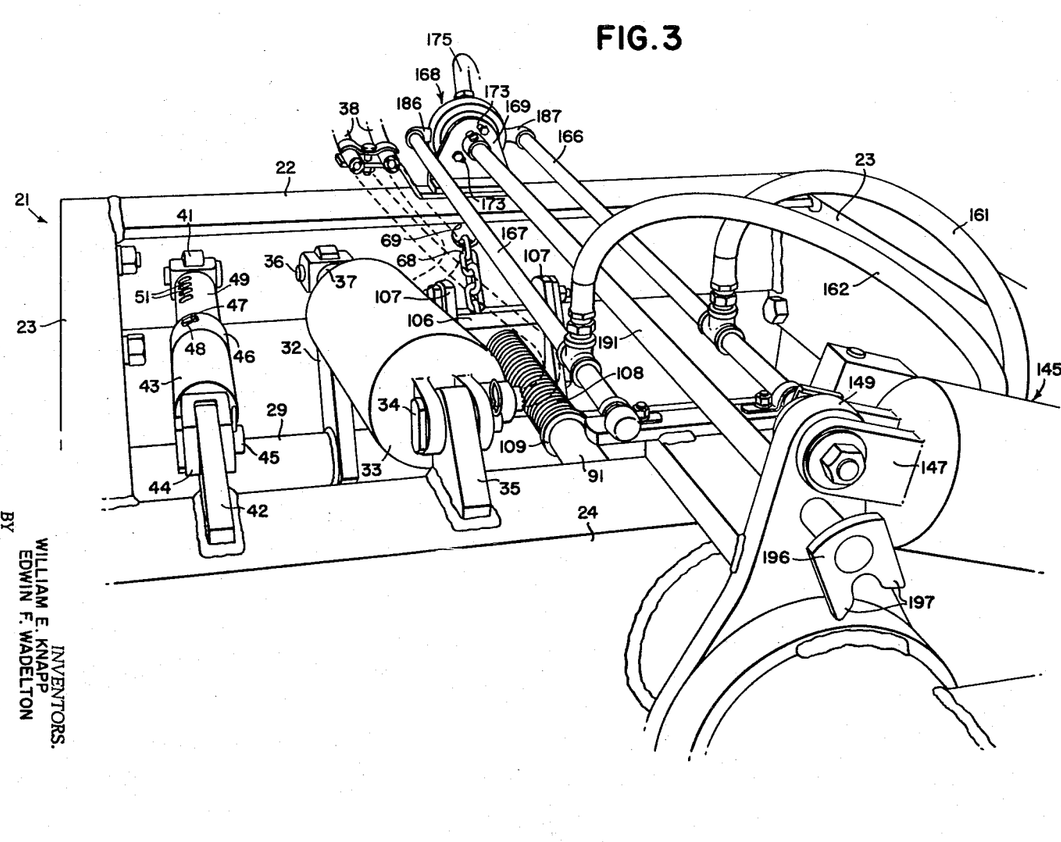
FIG. 3 is an enlarged fragmentary perspective view showing the raising and lowering cylinder, a portion of the roll-over cylinder, and the associated rotary selector valve.

By virtue of the construction just described, the rear furrow wheel may swing laterally about a generally vertical axis as defined by the pivot members 75 and 76 and may also swing generally vertically about the transverse axis defined by the pivot 82. For example, when the plow is to be lowered into operating position, the rear wheel support bracket 81 may be swung upwardly from the position shown in FIG. 4 to the position shown in FIG. 5, and to this end, a connection is established between the rear support bracket 81 and the front wheel carrier rockshaft 29 so that when the front wheels 13 and 14 are raised to permit the frame and plow bottom to lower, the rear wheel support bracket 81 is swung into the position shown in FIG. 5 to permit rear portions of the frame and associated parts to lower relative to the rear furrow wheel 88. As will best be seen from FIGS. 4 and 5, a link 91 extends from the rear wheel support bracket 81 forwardly through the stationary pipe member 18 of the carrier frame. The rear end of the member 91 carries a yoke 102 that is pivotally connected to a bar 103 that is fixed to the rear wheel support bracket 81. The connection between the link 91 and the bar 103 is in the nature of universal joint providing both vertical and transverse axes, the vertical axis of the universal joint connection, when the position shown in FIG. 4, coinciding with the vertical axis as defined by the pivot members 75 and 76, so as not to interfere with the lateral swinging of the rear wheel support bracket 81 which will be referred to below. The link member 91 extends forwardly through the rearwardly extending carrier frame pipe member 18 and through an opening in the rear carrier frame cross member 24 to a point between the front frame member 22 and 24 (FIG. 3) where the link member 91 extends through a trunnion 106 that is rockably mounted on a pair of arms 107 fixed to the shaft 29, as best shown in FIG. 3. A spring 108 is disposed about the front end of the link 91 and bears against the trunnion 106 and against a collar 109 fixed to the link 91. The forward end of the link 91 is screw threaded and, forwardly of the trunnion 106, carries a slotted nut held in different positions of adjustment by the usual cotter pin. Thus, when the cylinder 33 is extended to raise the front end of the plow frame, the arms 107 are swung forwardly, and this acts through the above-mentioned nut and the link 91 to exert a pull through the latter against the arms 103 on the wheel support bracket 81, thus swinging the latter forwardly and downwardly to raise the rear end of the plow frame. The parts are so adjusted and arranged that the front and rear ends of the plow frame are raised and lowered substantially equal amounts when the cylinder 33 is operated to swing the forward wheel frame arms 28.

Figure 4:
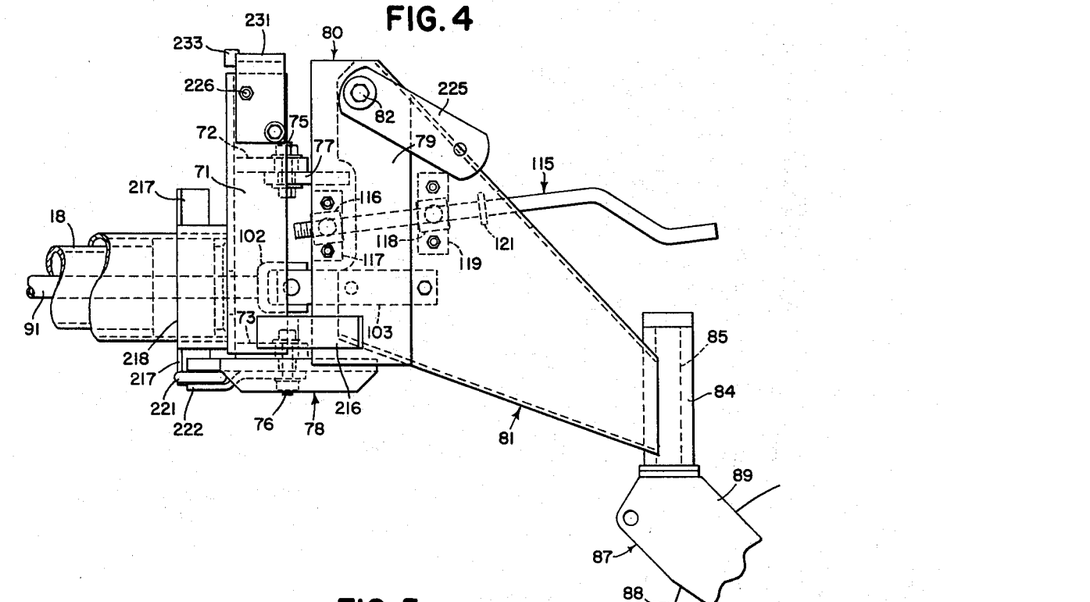
FIG. 4 is a fragmentary side view of the rear end construction of the plow of this invention showing the rear wheel and associated parts in frame-raised position with the standards disposed in a vertical position.
Figure 5:
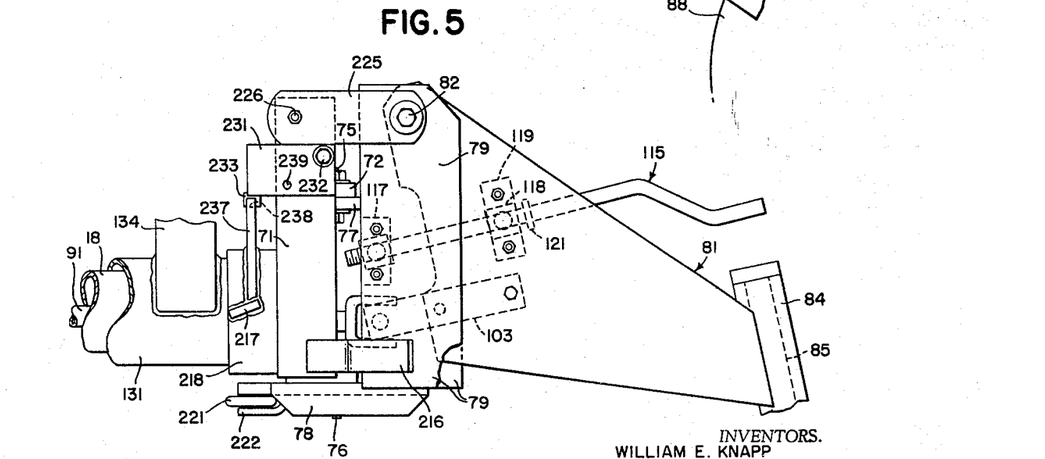
FIG. 5 is a view similar to FIG. 4, showing the rear end construction of the plow in working or frame-lowered position, but with the standard frame locked in horizontal or mid-point position.

Since the link 91 is free to shift forwardly through the trunnion 106 (FIG. 3) stop means is provided for independently limiting the upward and rearward movement of the rear furrow wheel 88 relative to the rear portion of the carrier frame wherein the forward wheels are raised relative to the carrier frame. Such stop means is shown in FIGS. 4 and 5 and includes a screw crank 115. The forward end of the crank screw 115 is screw threaded and receives a trunnion member 116 that is rockably carried by a bracket 117 bolted to the plates 79. The central portion of the crank screw 115 is slidable in a trunnion member 118 rockably carried in a bracket 119 that is fixed to the wheel support member 81. A stop collar 121 is carried by the crank screw 115 so as to limit the outward movement of the support member 81 relative to the plates 79. Thus, depending upon the adjustment of the member 115, when the forward wheels 13 and 14 are raised relative to the carrier frame and as a consequence thereof the link 91 shifts rearwardly, the rear furrow wheel 88 swings upwardly and rearwardly to the extent permitted by the adjusting crank 115.

Referring again to FIG. 1, the standard frame 17 is rockably mounted on the rearwardly extending part 18 of the carrier frame 11. The standard frame includes fore-and-aft extending pipe member 131 to which beams or bars 132, 133 and 134 are fixed, as by welding. These beams are of progressively differing lengths and all extend from the same side of the pipe member 131 and generally lie in the same plane, a plane that passes through the axis of the pipe member 131. Standards 135, 136 and 137 are fixed at their mid points to the outer ends of the beams 132, 133 and 134, the standards being disposed perpendicularly to the plane of the beams 132-134. The longer beams 132 and 133 are reinforced by a fore-and-aft extending pipe section 138 welded or otherwise rigidly fixed to the beams 132 and 133 laterally outwardly of the pipe member 131. One end of each of the standards 135-137 carries a right hand plow bottom and the other end carries a left hand plow bottom. The right hand plow bottoms are indicated by the reference numerals 141 and the left hand plow bottoms are indicated by the reference numerals 142. The rearwardly extending carrier frame member 18 rotatably supports the pipe member 131 through a plurality of bearing sleeves 144 so that the standard frame turns relatively freely from one plowing position to the other, the right hand plowing position being illustrated in FIG. 1.

Figure 6:
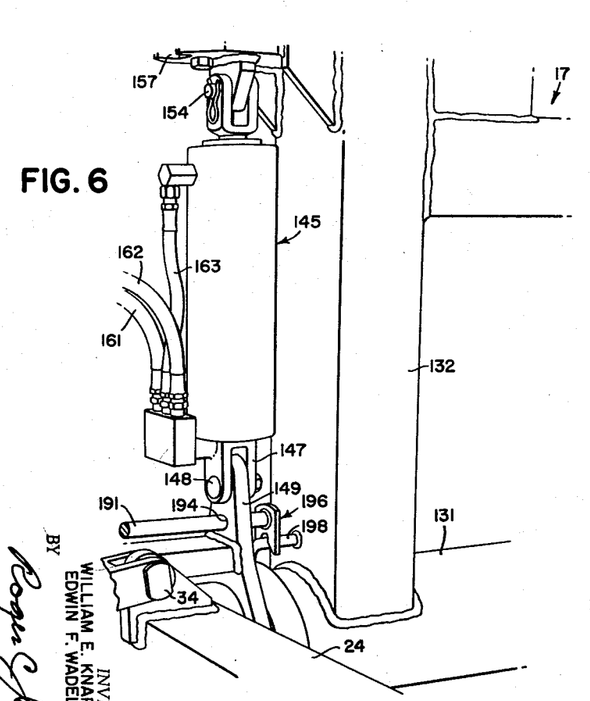
FIG. 6 is a fragmentary perspective view showing the roll-over cylinder and the associated standard frame in a mid-position with the roll-over cylinder in its retracted position.

The standard frame 17 is swung from one plowing position over to the other plowing position by means of a roll-over cylinder 145. FIG. 1 shows the right hand plowing position and FIG. 2 shows the left hand plowing position. As best shown in FIG. 6, one end of the cylinder 145 is provided with a yoke 147 apertured to receive an attaching pin 148 that extends through a vertically extending apertured lug 149 that is fixed to a short sleeve 150 that is welded to the rear cross bar 24 of the carrier frame section 21. A piston rod 151 (FIG. 7) normally extends from the outer end of the cylinder 145 and carries a yoke 152 that is apertured to receive a detachable pin 154 that releasably connects the piston rod with an apertured lug 155 that is carried by a longitudinally extending bar 156 that forms a rigid part of the standard frame 17. The forward end of the bar 156 is notched as at 157, and carries a roller 158 that forms a part of frame locking means that will be referred to below.

When the standard frame is in its mid-point or middle position, FIG. 6, half-way between right and left hand plowing positions, the frame beams 132, 133 and 134 extend substantially directly upwardly, and likewise the cylinder 145 is disposed in a vertical position with the piston rod 151 retracted into the cylinder 145. Fluid lines 161, 162 and 163 connect fluid under pressure to opposite ends of the cylinder 145, selectively, and as best shown in FIG. 3, the fluid lines 161 and 162 are connected to pipes 166 and 167 that at the forward ends are connected through suitable fittings with a rotary selector valve unit 168 supported at the front of the carrier frame by a suitable bracket 169 bolted to the forward cross bar 22.

Figure 9:
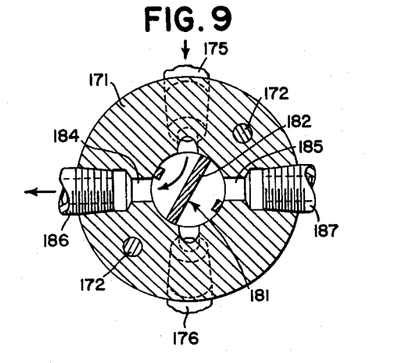
FIG. 9 is a sectional view taken along the line 9—9 of FIG. 8 showing the rotary valve member in one position.
Figure 10:
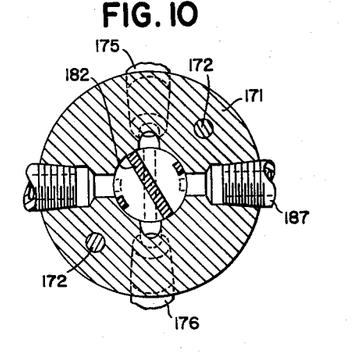
FIG. 10 is a view similar to FIG. 9, showing the rotary valve member in the opposite position.

The construction of the rotary selector valve unit 168 is best shown in FIGS. 3 and 8-10. The valve unit includes a casing 171 connected by a pair of bolts 172 to the bracket 169, the bolts 172 extending through slots 173 whereby, by loosening the bolts, the casing 171 may be rotated to different angular positions as required for timing the operation of the valve. The pipe members 166 and 167 are of sufficient length to have the flexibility to accommodate the limited angular shifting of the valve unit 168 when the timing is adjusted. Fluid from the power unit on the tractor is delivered to the valve unit 168 through a pair of connections 175 and 176. The valve casing 171 includes a generally cylindrical chamber in which a rotary valve member 181 is disposed, the member 181 having a dividing wall 182 (FIGS. 9 and 10). The casing 171 also includes a pair of ports 184 and 185 into which fittings 186 and 187 are secured, these fittings receiving the forward ends of the pipe members 166 and 167 as best shown in FIG. 3.

Assuming that the connection 175 receives high pressure fluid from the tractor, when the valve member 181 is in the position shown in FIG. 9, high pressure fluid is directed into the fitting 186 from which it flows through the pipe 167 and the hose line 162 to one end of the cylinder 145. When the valve member 181 is turned to the other position (FIG. 10) high pressure fluid is delivered by the fitting 187 to the pipe 166 and from the latter through the hose 161 to the other end of the roll-over cylinder 145. Means in the form of ball detents 190 (FIG. 8) and associated recesses in the end of the valve member 181 are provided for establishing or determining the two positions which the valve member 181 may take. The ball detents act to retain the valve at either of its two operative positions. When the valve is in its center position, mid-way between its two end positions, as shown in dotted lines in FIG. 10, hydraulic fluid is free to flow from one end to the other of the roll-over cylinder. This occurs when the frame 17 is raised to the position shown in FIG. 6.

Figure 7:
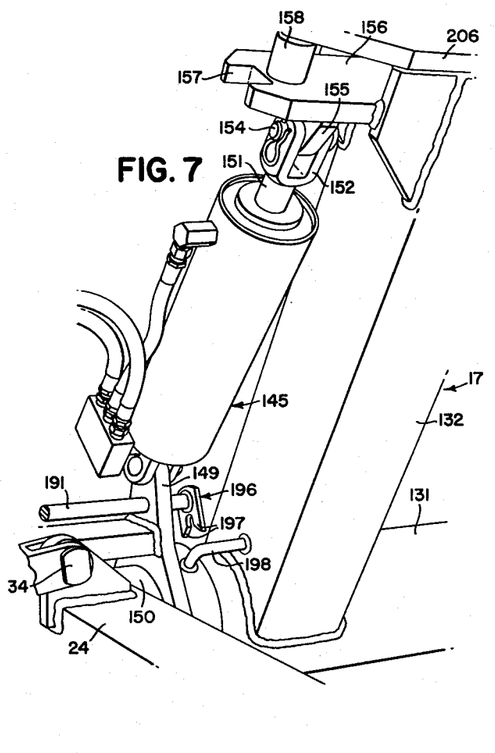
FIG. 7 is a fragmentary perspective position showing the standard frame swung part of the way over toward one of its plowing positions, with the movement of the standard frame under the control of the roll-over cylinder.
Figure 8:
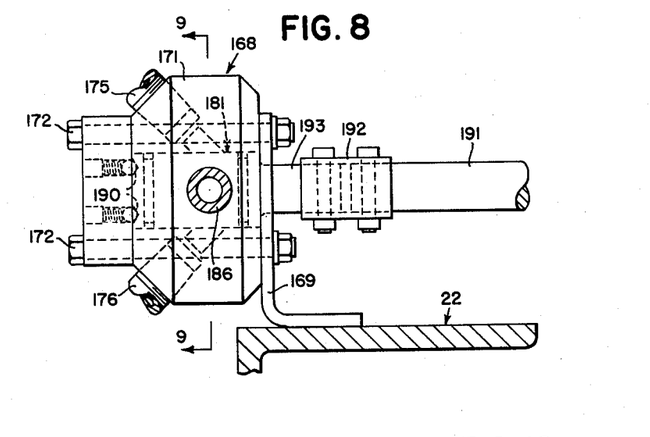
FIG. 8 is a fragmentary elevation showing the rotary selector valve and a portion of the operating means therefor.

The valve member 181 is controlled by an operating rod 191 (FIGS. 3, 6, 7 and 8) that is secured by a coupling 192 bolted to the valve stem 193 and supported in an opening 194 (FIG. 6) in the cylinder-supporting lug 149. The rear end of the rod 191 carries a fork member 196 bifurcated portions of which are adapted to straddle a pin 198 carried by the forward outwardly extending beam member 132 (FIGS. 6 and 7). Thus, when the standard frame moves from one plowing position through its mid position (FIG. 6) to the other plowing position, the pin 198 acts to rock the shaft 191 through an angular extent sufficient to swing the rotary valve member 181 from one position to the other (FIGS. 9 and 10), thus serving to reverse the cylinder 145. It will be noted that the axis 148 about which the cylinder 145 swings relative to the carrier frame 11 lies well above the axis of rocking movement of the standard frame 17 so that the cylinder 145 is in its retracted position (FIG. 6) when the standard frame 17 swings through its mid position.

When it is desired to change, for example, from right hand plowing to left hand plowing (FIG. 1 to FIG. 2), the power lift mechanism of the tractor is actuated so as to direct fluid under pressure back to the rear end of the lift cylinder 33, which serves to raise the carrier frame to its transport position (FIG. 1). Then the power lift mechanism of the tractor is actuated to direct fluid under pressure to the outer end of the roll-over cylinder 145 causing the cylinder to retract, and in so doing the standard frame 17 is rotated from the position shown in FIG. 1 up to the mid position (FIG. 6). As the standard frame approaches its mid position the pin 198 engages the cam member 196 and swings the same first to the position shown in FIG. 6 and then, as momentum carries the standard frame past its mid position, the cam member 196 completes the reversal of the valve member 181 so that now fluid under pressure is directed to the inner or lower end of the roll-over cylinder 145 so that pressure exerted on the inner or lower end of the cylinder now acts to extend the latter which continues the roll-over movement of the standard frame until it reaches the position shown in FIG. 2; of course, gravity also acts to continue the roll-over movement of the standard frame so that now the principal function of the cylinder 145 is to control the roll-over movement so that the rate of movement does not become excessive under the action of gravity.

Stop means is provided for determining the plowing positions, and such means includes the bracket 156 and the roller 158 (FIG. 7) described above as carried by the standard frame 17. As best shown in FIGS. 1 and 11, the carrier frame 11 is provided with an end plate 201 fixed to each end of the transverse frame member 24. Each end plate 201 is provided with a hook-like extension 202 that serves as or provides a socket 203 in which the roller 153 on the rockable standard frame 17 is adapted to seat when the standard frame is swung into a plowing position, as best shown in FIG. 11. The lug 156 is reinforced by an end plate 206 (FIG. 7) in serving as a support for the stop roller 158.

Each end of the rear transverse beam 24 of the carrier frame 11 has its front and rear portions apertured to slidably receive a latch bar 211, the rear end of which is adapted to enter the socket 157 formed in the lug 156, as best shown in FIG. 7. An adjustable link 212 pivotally connects the latch bar 211 to an extension 213 that is welded to the outermost end of the associated rockshaft 29. There is a latch bar 211 at each side of the carrier frame, and each of these latch bars is shifted rearwardly relative to the end of the cross beam 24 when the rear ground wheels 13 and 14 are raised to permit the carrier frame to move downwardly into a plowing position. Thus, in moving into a plowing position, the standard frame is first swung into a position with the roller 153 seating in the associated socket 203, the latter being disposed to hold the lug 156 in a position to receive the rear end of the associated latch bar 211 when the wheels 13 or 14 are raised relative to the carrier frame to lower the latter. Thus, whenever the carrier frame is lowered into an operating position, the standard frame is locked in a plowing position by one or the other of the latch bars 211.

Referring again to the rear end construction shown in FIGS. 1, 4 and 5, it will be recalled that the pivot members 75 and 76 (FIG. 4) define a vertical axis about which the rear end support member 81 may swing laterally. Lateral swinging of the member 81 is limited by a pair of angled stop bars 216 fixed to the lower portions of the side plates 71. The purpose of swinging the rear furrow wheel support member 81 laterally from one side to the other is to bring the rear furrow wheel 88 into a position directly behind the rearmost operating plow bottom, yet have the rear furrow wheel in a truly centered and vertical position when the plow is arranged for transport. To this end, the rear end of the standard frame pipe 131 carries a pair of abutment bars 217 welded to a collar 218 that, in turn, is fixed in any suitable way to the rear end of the pipe member 131. The bars 217 are disposed so as to engage a roller 221 carried in a bifurcated section 222 of the lower member 78 that receives the lower pivot member 76, as best shown in FIG. 4. The bars 217 are so located that when the standard frame is turned into one or the other of its plowing positions, the bar 217 engaging the roller 221 acts through the member 78 to swing the rear portion of the rear wheel support member 81 the desired distance laterally so as to position the furrow wheel 88 to run in the furrow opened by the rearmost bottom. When the standard frame is in its mid position (FIGS. 5 and 6), the bars 217 are out of engagement with the roller 221, and hence the rear wheel support member 81 is free to swing laterally about the axis defined by the pivot members 75 and 76. However, if it should be desired to limit or eliminate this lateral swinging, a pair of transport bars 225, which are swingably mounted on the bolt 82, may be swung forwardly over the upper end of the channel member 71 (FIG. 5) and held in place by a transport locking bolt 226. This holds the member 81 against lateral swinging, and while the rear furrow wheel fork 89 is free to swing laterally, the shank 85 is disposed at an angle. Thus, the weight of the rear portion of the plow tends to resist lateral swinging of the rear furrow wheel and thus serves to hold the plow moving in a substantially straight-ahead position during transport. When the plow is to be placed in plowing position, the transport bars 225 are swung to the position shown in FIG. 4, after removing the transport locking bolt 226.

When transporting the plow from place to place, it is desirable to hold the standard frame in its mid position (FIG. 6) and to this end we provide a transport link 231 that comprises a generally U-shaped member (FIG. 1) that straddles the upper end of the support structure 71, the link being swingably mounted on a transverse pin or bolt 232 (FIG. 5). The U-shaped member 231 carries a lug 233 that is adapted, when swung downwardly to the position shown in FIG. 5, to enter a notch 238 formed in the central portion of an arcuate plate 237 welded to the collar 218, as best shown in FIG. 5. Openings 239 are formed in the side portion of the U-shaped member 231 to receive the locking bolt 226 if it is desired to lock the U-shaped member 231 in frame-holding position. Similar openings are also formed in the side plates 71 in line with the openings 239 (FIG. 5) to receive the locking bolt 226. This arrangement serves to lock the standard frame 17 in a position with the standards 135–137 in an upper position and horizontal. In this position the carrier frame may be lowered to secure improved transport stability, as shown in FIG. 5.

While we have shown and described above a preferred structure in which the principles of this invention have been incorporated, it is to be understood that my invention is not to be limited to the particular details shown and described above, but that, in fact, widely different means may be employed in the practice of the broader aspects of our invention.

What we claim, therefore, and desire to secure by Letters Patent is:

1. A two-way plow comprising
   a carrier frame having a rearwardly extending part,
   a standard frame carrying right- and left-hand plow bottoms, and including a fore-and-aft extending part rockable about said rearwardly extending part between right-hand and left-hand plowing positions,
   a hydraulic ram unit swingably connected at one end to said carrier frame at a point above said rearwardly extending part and at its other end to said standard frame at a point that lies directly above said first point of connection when the standard frame is in a midposition,
   retraction of said ram unit acting to swing said standard frame from either of its plowing positions upwardly to its midposition and extension of said ram acting, when the standard frame is moved a slight distance away from its midposition toward one of its plowing positions, to shift said standard frame over toward said one plowing position,
   and reversible valve means actuated by movement of said standard frame through its midposition to change the direction of pressure fluid flow to said ram unit.

2. A two-way plow comprising
   a carrier frame having means serving as a generally fore-and-aft extending bar,
   a standard frame rockably mounted on said bar,
   a plurality of plow standards fixed to said standard frame at different distances from the axis of rocking of said standard frame, each standard carrying a right-hand and left-hand bottom fixed to opposite ends of the standard and all of said standards and plow bottoms being disposed at the same side of said axis,
   whereby when the standard frame is turned to a position in which the plow bottom and standards lie directly above the axis of rocking of said standard frame, the latter is in a position of unstable equilibrium but will move downwardly toward right-hand or left-hand plowing position if the plow is turned sharply in one direction or the other,
   and hydraulic cylinder means connected between said standard frame and said carrier frame to control the movement of the standard frame into either of its plowing positions.

3. A two-way plow comprising
   a carrier frame having a rearwardly extending part, a standard frame swingably mounted on said part and including bars of different lengths extending generally radially from one side of said frame in coplanar relation, double-ended plow standards fixed at their midpoints to the outer ends, respectively, of said bars, right and left hand plow bottoms fixed to the ends of said plow standards, the right hand bottom being disposed on one side of the plane of said bars and the left hand bottom being disposed on the other side of said plane, means to swing said standard frame from one side of the carrier frame to the other for changing from right hand plowing to left hand plowing and vice versa, said means including a ram unit connected between said carrier frame and one of said bars and operative when retracted to swing said standard frame from a plowing position up to a transport position and when extended to swing said standard frame from a transport position to a plowing position, and valve reversing means carried by said carrier frame and including a part moved from one position to the other by movement of the standard frame through its midpoint position.

4. A two-way plow as defined in claim 3, further characterized by a reversing valve carried by said carrier frame and connected with opposite ends of said ram unit, a selector shaft rockably supported by said carrier frame and connected with said reversing valve to cause the retraction or extension of said ram unit, and means movable with said standard frame when the latter passes through its midpoint position for shifting said selector shaft.

5. The invention set forth in claim 4, further characterized by said selector shaft shifting means comprising a cam fixed to said shaft, and a trip member fixed to the standard frame bar adjacent said ram unit and engageable with said cam for shifting said shaft.

6. The invention set forth in claim 5, further characterized by said reversing valve including a casing, a bracket on the carrier frame, and bolt and slot means connecting said casing to said bracket and accommodating adjustment of the casing about the axis of said selector shaft.

7. A two-way plow comprising a carrier frame having a rearwardly extending part, a standard frame rockably mounted on said part through approximately 180° from a right hand plowing position to a left hand plowing position and vice versa, right and left hand plow bottoms fixed to said standard frame, an extensible and retractable hydraulic ram connected to act between said carrier frame and said standard frame for swinging the latter from near a midposition of the standard frame over into one or the other of its plowing positions, and valve means controlled by the position of said standard frame for selectively directing fluid under pressure to said ram to either extend or retract said ram.

8. A two-way plow of the towed type, comprising a carrier frame having a pair of forward ground wheels swingable generally vertically to raise and lower the front end of said carrier frame, a standard frame mounted on said carrier frame and swingable between right- and left-hand plowing positions, said carrier frame including a laterally shiftable rearwardly extending part to the rear of said standard frame, a rear furrow wheel connected for both generally vertival swinging and generally lateral shifting with the rear end of said part, means connecting said rear furrow wheel with said forward ground wheels whereby the latter and said rear furrow wheel may be swung generally vertically together, and means connected between said standard frame and said rearwardly extending part for shifting the latter laterally whenever said standard frame is swung from one plowing position to the other.

9. The invention set forth in claim 8 further characterized by a mounting for said rear furrow wheel swingably connected with the rear end of said rearwardly extending carrier frame part for movement relative thereto about a generally vertical axis, an arm fixed to said mounting and extending forward of said vertical axis, and a pair of abutments fixed to the rear portion of said standard frame and located thereon so that one or the other of said abutments engages and shifts said arm so as to shift said rear furrow wheel in one direction or the other when said standard frame is swung into one or the other of said plowing positions.

10. The invention set forth in claim 8 further characterized by said carrier frame including a forward section having front and rear transverse bars and a pair of fore-and-aft extending laterally spaced apart bars rigidly interconnected, and means serving as a rearwardly extending pivot bar fixed rigidly at its forward end to said rear transverse bar and about which said standard frame is swingably mounted.

11. A two-way plow comprising:

a carrier frame having a rearwardly extending part, a standard frame rockably mounted on said part through approximately 180° from a right-hand plowing position to a left-hand plowing position and vice versa, right- and left-hand plow bottoms fixed to said standard frame, a front wheel frame swingably connected with said carrier frame, locking bar means actuated by said wheel frame for locking said standard frame in either plowing position, said wheel frame including generally downwardly extending arms, said carrier frame including a transverse bar, having apertured end portions, a locking bar slidably mounted in each of said apertured end portions, said standard frame including a notched bar located so as to be aligned with one or the other of said locking bars when the standard frame is in a plowing position, and means for operating said locking bars from said wheel frame arms.

12. A two-way plow comprising:

a carrier frame including a rearwardly extending part, a standard frame rockably mounted on said part for movement about a generally fore-and-aft extending axis and carrying standards supporting right- and left-hand plow bottoms, said standard frame being swingable about said axis between right- and left-hand plowing positions, a power cylinder connected between said frames for swinging said standard frame from a midposition to either of its plowing positions, and valve means for reversing the flow of fluid to said cylinder when said standard frame passes through its midposition, said valve means being actuated by movement of said standard frame through its midposition to change the direction of pressure fluid flow to said power cylinder.

13. A two-way plow comprising:
a carrier frame including a rearwardly extending part,
a standard frame rockably mounted on said part for movement about a generally fore-and-aft extending axis and carrying standards supporting right- and left-hand plow bottoms,
said standard frame being swingable about said axis between right- and left-hand plowing positions,
a power cylinder connected between said frames for swinging said standard frame from a midposition to either of its plowing positions,
said power cylinder being pivoted to said carrier frame at a point above the axis of swinging of said standard frame,
said power cylinder including a piston rod pivotally connected with said standard frame,
said cylinder being pivoted to the carrier frame at a point below the pivotal connection of said piston rod to said standard frame when said standard frame is in an intermediate position between the right- and left-hand plowing positions,
and valve means carried by said carrier frame for reversing the flow of fluid to said cylinder when said standard frame passes through its midposition.

14. A two-way plow comprising:
a carrier frame having a transverse bar and a rearwardly extending part,
a front wheel frame swingably connected with said carrier frame and having generally downwardly extending arms,
a standard frame rockably mounted on said rearwardly extending part and rotatable between right- and left-hand plowing positions,
said standard frame having a transverse member adapted to cooperate with said transverse bar,
means longitudinally slidably carried by said transverse bar and engageable with said transverse member to effectively lock said standard frame in either a right- or left-hand plowing position,
and means responsive to the swinging of the front wheel frame to cause the means on said bar to slide rearwardly to engage said transverse member to lock said frame from rotation.

References Cited by the Examiner
UNITED STATES PATENTS

| | | | |
|---|---|---|---|
| 2,625,090 | 1/53 | Pursche | 172—206 |
| 2,633,786 | 4/53 | Pursche | 172—227 X |
| 2,658,438 | 11/53 | Seng | 172—459 |
| 2,807,200 | 9/57 | Pursche | 172—208 |
| 2,830,519 | 4/58 | Chandler | 172—226 X |
| 2,879,853 | 3/59 | Seng | 172—226 |
| 2,882,979 | 4/59 | Chandler | 172—225 |

FOREIGN PATENTS

| | | |
|---|---|---|
| 539,499 | 4/57 | Canada. |
| 1,164,355 | 5/58 | France. |
| 847,664 | 11/52 | Germany. |
| 1,150 | 1872 | Great Britain. |
| 271,441 | 2/28 | Great Britain. |

T. GRAHAM CRAVER, *Primary Examiner.*

A. JOSEPH GOLDBERG, *Examiner.*